March 29, 1966   B. Z. CHERTOK   3,243,209
HIGH PRESSURE FITTINGS
Filed March 29, 1963
FIG. 1
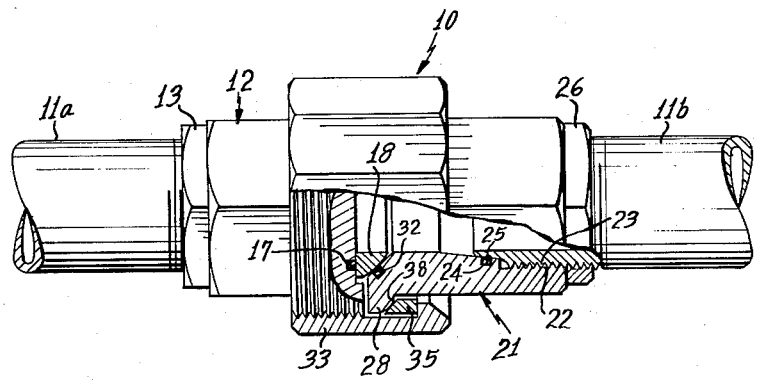
FIG. 2
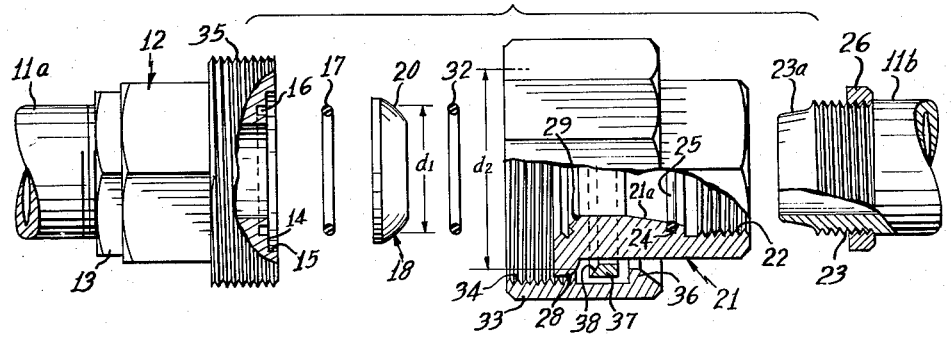
FIG. 3
INVENTOR.
BURTON Z. CHERTOK
BY James A. Eisenman
ATTORNEY

United States Patent Office 3,243,209
Patented Mar. 29, 1966

3,243,209
HIGH PRESSURE FITTINGS
Burton Z. Chertok, Massapequa, N.Y., assignor to Uniplex Corp., Syosset, N.Y., a corporation of New York
Filed Mar. 29, 1963, Ser. No. 268,938
9 Claims. (Cl. 285—261)

This invention relates to pipe fittings and more particularly pipe fittings capable of withstanding relatively high fluid pressures and accommodating misalignment of pipe sections joined thereby.

Presently used pipe fittings such as unions and like coupling members depend for the most part on the use of sealing compounds to eliminate leakage through threads and upon precision of alignment of parts to prevent leakage across clamped surfaces.

Attempts have been made to overcome these problems by the use of swivel joints to accommodate misalignment and by the use of sealing members such as washers, O rings and the like between opposed surfaces. Such designs have not been altogether successful due to the inability to obtain balanced clamping forces and to resist the adverse effects of environmental influences such as vibration, expansion and contraction due to temperature changes, and the like.

It is therefore one object of the present invention to provide an improved pipe fitting design by means of which two pipe elements can be coupled and which affords highly effective pressure sealing characteristics.

Another object of the invention is to provide an improved pipe fitting which is capable of joining two pipe sections which can be misaligned over a substantial angle.

Still another object of the invention is to provide an improved pipe fitting in which the elements can be clamped and secured against motion in any one of a range of angular positions.

Still another object of the invention is to provide a pipe fitting capable of sealing relatively high fluid pressures and which can be reused many times without impairing the effectiveness of the seal.

These and other objects and features of the present invention will be apparent having reference to the following specification taken in conjunction with the drawing in which, FIGURE 1 is a view in side elevation, partly broken away in longitudinal section of a pipe fitting taking the form of a union coupling two sections of conduit;

FIGURE 2 is an exploded view of the fitting of FIGURE 1, also shown partly in longitudinal section; and FIGURE 3 is a fragmentary view in enlarged scale of a portion of the fitting in FIGURE 1 illustrating the geometrical relationship between the parts thereof.

Referring to the drawings, the invention is illustrated as embodied in a pipe fitting taking the form of a union identified generally by the numeral 10 coupling two sections of pipe 11a and 11b. The union includes a seat piece 12 threaded onto the pipe section 11a and secured by a locknut 13. The seat piece includes a squared-off inner face 14 surrounded by an annular shoulder 15 and formed internally of the shoulder with a recess or groove 16 adapted to receive an O ring 17. Fitted against the squared-off face 14 within the annular shoulder 15 is a sealing ring 18, the outside diameter of which is less than the inside diameter of the shoulder 15 to afford limited relative sliding motion between the squared-off face 14 of the seat piece 12 and a correspondingly squared-off face 19 of the sealing ring 18. The other face 20 of the sealing ring 18 is spherically contoured on a radius $r_1$ (FIGURE 3), i.e. convexly rounded. Secured to the pipe section 11b is a socket piece 21 having tapered internal threads 22 which mesh with correspondingly tapered external threads 23 on the pipe section 11b. The tapered forward end 23a of the pipe section, which is free of threads, is adapted to be moved to contiguous relationship with a correspondingly tapered and smooth surface 21a on the socket piece 21. Where the tapered and smoothed surfaces of the pipe section 11b and the socket piece 21 overlap, the socket piece is formed with a circular groove or recess 24 adapted to receive an O ring 25 which is compressed by the mated, tapered surfaces when the parts are tightly set up. If desired, a locknut 26 can be provided to secure the coupling between the pipe section 11b and the socket piece 21.

As best seen in FIGURE 3, the inner end of the socket piece 21 is formed with a spherically contoured annular surface 28 and an inclined substantially flat surface 29 formed with an annular groove or recess 30 adapted to receive an O ring 32. The spherically contoured surface 28 has a radius of curvature $r_2$ which, when the fitting is assembled, has a center axially displaced from the center of curvature of the spherically contoured face 20 of the sealing ring 18, all as described more fully below.

Surrounding the socket piece 21 for axial sliding movement thereon is clamping means in the form of a joining nut 33 internally threaded at 34 to mesh with external threads 35 formed on the seat piece 12. The opposite end of the joining nut 33 is formed with a shoulder 36, the inside diameter of which exceeds that of the socket piece 21 to afford radial clearance therebetween and which affords a sliding coupling. Interposed between the shoulder 36 of the joining nut 33 and the spherically contoured surface 28 of the socket piece 21 is a skid washer 37 having an inclined surface 38 adapted to slide on the spherically contoured surface 28.

When the fitting is assembled, as best seen in the enlarged fragmentary view of FIGURE 3, the inclined face 29 of the socket piece is pressed against the spherically contoured surface 20 of the sealing ring 18 compressing the O ring 32 and pressing the flat surface 19 of the sealing ring 18 against the squared-off face 14 of the seat piece 12, also compressing the O ring 17.

It will be observed that with the joining nut 33 turned up to seat the skid washer 37 tightly against the spherically contoured surface 28 of the socket piece 21 and with the inclined surface 29 of the socket piece seated smoothly against the spherically contoured surface 20 of the sealing ring 18 which in turn seats with its squared-off surface 19 against the squared-off or flat surface 14 of the seat piece, a rigid, pressure-tight assembly results wherein leakage of fluid under pressure is blocked by the engaged surfaces including the activated O rings. The socket piece is prevented from cocking or swiveling by virtue of the binding action arising as a result of the different centers of curvature $c_1$ and $c_2$ of the two spherical surfaces. In the illustrated embodiment of the invention, the radius $r_2$ is slightly larger than the radius $r_1$ and the tangent circle diameters $d_1$ and $d_2$, in the curved surfaces 20 and 38, respectively, are also different. The combined interaction of radii, diameters, and centers, is such that the assembly locks rigidly when the joining nut is set up.

Assuming that the pipe sections 11a and 11b are out of alignment either at angles or laterally offset, or both, the fitting can nevertheless be set up to afford a leak-tight seal against relatively high fluid pressure differentials. The axis of the sealing ring can be offset laterally by virtue of edgewise or lateral sliding motion on the surface 14 and the shoulder 36 will be shifted relative to the skid washer 37 which can, when required, assume a different position on the spherical surface 28. The tangential relationship between the inclined surface 29 of the socket piece and the spherically contoured surface 20 of the sealing ring 18 will obtain over several degrees of angular displacement. The axial pressure across the contiguous surfaces of the sealing ring and seat piece will, however, be effectively maintained. The radial and angular displacement of the relatively movable parts occurs before the joining nut is set up tightly, but once set up, all signfiicant parts will be effectively locked in place.

While the invention has been described above having reference to specific embodiments thereof, it will be understood that it can take various forms and arrangements within the scope of the invention described. Thus, for example, the seat piece 12 can be formed with an inclined surface corresponding to the inclined surface of the socket piece while the socket piece can be formed with a squared-off or flat surface corresponding to the flat surface 14 of the seat piece. In this arrangement, the sealing ring will of necessity be reversed so that its spherical surface faces the seat piece and its flat surface, which is perpendicular to the axis fitting, will oppose the socket piece. In such arrangement the centers of curvature of the two spherically curved surfaces will again be offset along the axis of the fitting. Also, if desired, the skid washer can be eliminated by causing the shoulder 36 to slide on the spherically contoured surface of the socket piece, it being understood, however, that the shoulder would in such case be contoured to establish a bearing surface to oppose the spherically contoured surface. Also, the sealing ring can be formed integrally with the seat piece by forming a spherically contoured surface thereon to engage in tangential relationship the inclined surface of the socket piece. It will be understood, however, that the latter arrangement, while effecting a seal against fluid pressure, will not facilitate axial misalignment of the pipe sections. The invention should not, therefore, be regarded as limited except as defined in the following claims.

I claim:

1. A pipe fitting for joining pipe sections end to end over a range of misalignment, comprising, a first pipe-receiving section having at one of its ends an annular sealing piece, said sealing piece engaging a radical face on said first pipe-receiving section forming a coupling affording radial components of motion, an annular socket piece to receive the sealing piece, said sealing pieces having opposed, inner and outer faces generally inclined in the same direction to the center line of the fitting, the face of the sealing piece being convexly rounded on a radius swung from a point on the central axis thereof, and clamping means to press the first pipe-receiving section and the sealing and socket pieces into sealing engagement, said clamping means including a clamping member operatively mounted on said first pipe section and engaging the outer surface of the socket piece, said outer surface on the socket piece being rounded convexly on a radius swung from a point on the central axis thereof, said point being spaced axially from the center of curvature of the rounded conical edge of the sealing piece, whereby the fitting is rendered rigid when clamping is effected by said clamping means.

2. A pipe fitting as set forth in claim 1, including a resilient sealing ring between the abutting surfaces of the sealing and socket pieces.

3. A pipe fitting as set forth in claim 1, including a bearing washer radially slidably interposed between the clamping member and the convexly rounded conical surface of the socket piece.

4. A pipe fitting as set forth in claim 1, said annular sealing piece including a flat sealing surface on the opposite edge from said rounded conical edge, said flat surface being disposed in a plane normal to the axis of the fitting, and a seat section on said first pipe section having a flat surface in a plane normal to the axis of the fitting to receive the flat surface of the sealing piece to afford lateral sliding movement of the latter.

5. A pipe fitting as set forth in claim 4, said first pipe-receiving section including coupling means to receive a pipe section in a substantially rigid, fluid-tight coupling therewith.

6. A pipe fitting as set forth in claim 5, said socket piece including coupling means to receive a pipe section in a substantially rigid fluid-tight coupling.

7. A pipe fitting as set forth in claim 4, including a resilient sealing ring interposed between the opposed flat surfaces of the seat section and the sealing piece.

8. A pipe fitting as set forth in claim 7, including shoulder means carried by the first pipe section to limit the lateral sliding movement of the sealing piece.

9. A pipe fitting as set forth in claim 5, said means to receive a pipe section comprising a female conical inner section and axially spaced therefrom, a female threaded outer section, a groove in the conical inner section and a resilient sealing ring in the groove.

References Cited by the Examiner

UNITED STATES PATENTS

| | | | |
|---|---|---|---|
| 188,213 | 3/1877 | Weiss | 285—261 |
| 301,466 | 7/1884 | Hopkins et al. | 379—16 |
| 655,088 | 7/1900 | Kane | 285—334.4 |
| 1,176,261 | 3/1916 | Ziegler | 285—334.4 |
| 1,652,064 | 12/1927 | Sweney | 285—263 |
| 2,477,762 | 8/1949 | Monroe | 285—266 |
| 2,628,112 | 2/1953 | Hebard | 285—264 |
| 2,767,564 | 10/1953 | Green | 279—16 |
| 2,980,451 | 4/1961 | Taylor et al. | 285—333 |

CARL W. TOMLIN, *Primary Examiner.*

D. W. AROLA, *Assistant Examiner.*